F. J. & M. A. KRIVACHEK.
CHECK ROWER FOR CORN PLANTERS.
APPLICATION FILED APR. 9, 1909.
974,080.
Patented Oct. 25, 1910.
3 SHEETS—SHEET 1.
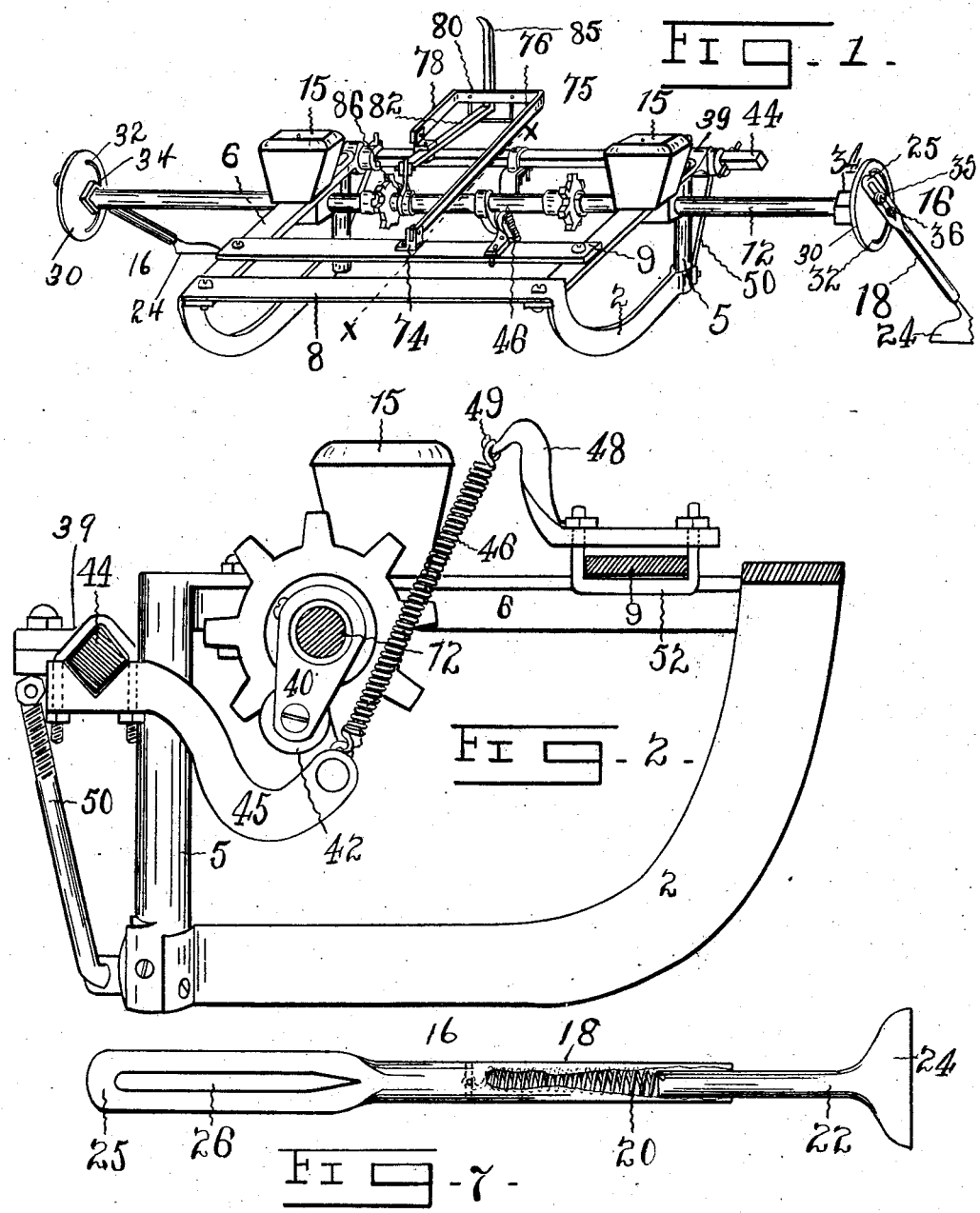

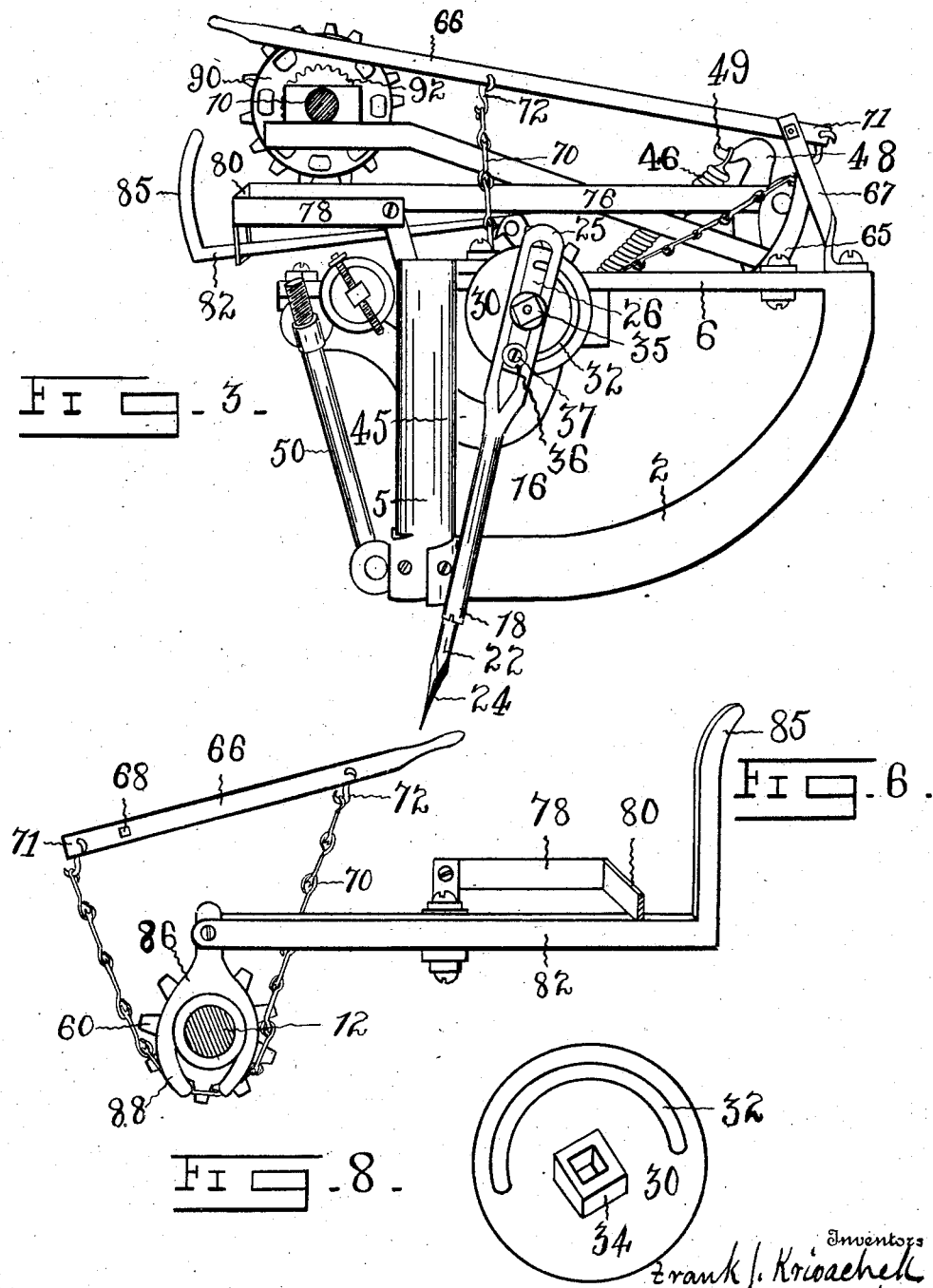

F. J. & M. A. KRIVACHEK.
CHECK ROWER FOR CORN PLANTERS.
APPLICATION FILED APR. 9, 1909.
974,080.
Patented Oct. 25, 1910.
3 SHEETS—SHEET 3.
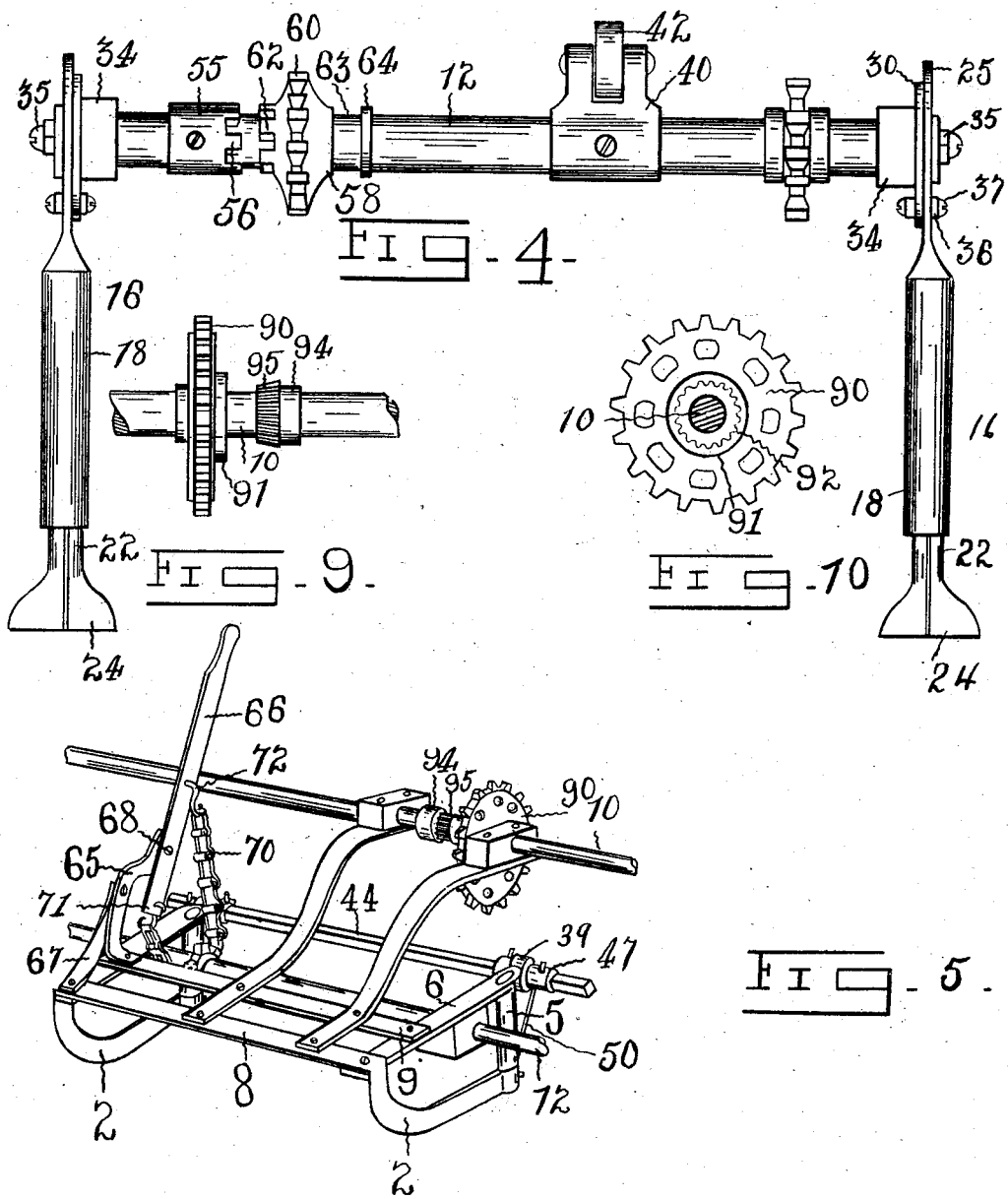

UNITED STATES PATENT OFFICE.

FRANK J. KRIVACHEK AND MATTHEW A. KRIVACHEK, OF FORT ATKINSON, IOWA.

CHECK-ROWER FOR CORN-PLANTERS.

974,080.  Specification of Letters Patent.  Patented Oct. 25, 1910.

Application filed April 9, 1909. Serial No. 488,991.

*To all whom it may concern:*

Be it known that we, FRANK J. KRIVACHEK and MATTHEW A. KRIVACHEK, both citizens of the United States, residing at Fort Atkinson, in the county of Winneshiek and State of Iowa, have invented certain new and useful Improvements in Check-Rowers for Corn-Planters, of which the following is a specification.

Our invention has relation to corn planters, with special reference to attachments for marking or check rowing to indicate the place where the corn is to be dropped; and the object is to provide a check-rower that will mark or check the ground at a predetermined distance from a planted row and not only on a line parallel with such row but also on a line at right angles thereto and which requires no special make of planters but can be readily attached to any of the well known make of corn planters.

A further object is to provide a check-rower that will automatically adapt itself to different varieties and different conditions of the field to be planted and also to the irregularities of the surface of the ground, whereby the planting will always be in parallel rows and preferably in two directions, whatever the conditions of the surface of the field.

A still further object is to provide means whereby the initial hill of each row will be always dropped and the ground marked on the same line and at a given point.

In order that the invention may be fully understood we will particularly describe the same in the following specification having reference to the accompanying drawings forming a part hereof.

Figure 1 is a perspective view with part of the attachments removed. Fig. 2 is a longitudinal section on a line X—X of Fig. 1. Fig. 3 is an end view. Fig. 4 is an elevation view of the dropping shaft removed. Fig. 5 is a perspective view from one conren. Fig. 6 is a side view of the lever and attachments for operating the planter to drop the initial hill. Fig. 7 is a side elevation of the marker arm with part cut away showing the spring for actuating the spade. Fig. 8 is a side elevation of the adjusting attachment for the marker. Fig. 9 is a perspective view of the drive sprocket that is attached to the axle of the planter. Fig. 10 is a plan view of one end of the sprocket wheel.

Referring to the drawings 2 designates the shoes or furrow openers of the front or runner frame of a corn planter and 5 the tubes through which the corn is dropped. The tubes 5 are secured to the rear ends of the side bars 6 to which also the forward end of the shoes 2 are attached. The two shoes 2 and the side bars 6 are rigidly secured at their front ends by a plate 8. These side bars are also further connected together by a cross bar 9 set in the rear of the plate 8. These side bars 6, the plate 8 and the cross bar 9 form the front frame of the planter. Upon the side bars 6 are set the usual boxes 15 for holding the corn to be dropped and beneath these boxes there is journaled a round shaft 12 which controls the usual mechanism (not shown) that selects the corn to be dropped from the boxes 15. The shaft 12 projects some distance beyond each side bar 6 and is provided on its outer ends with check-marker 16, shown in Fig. 4. This marker 16 consists of a hollow marker arm 18 in which is located a spring 20 that is attached to the inside of the arm 18 and to the stem 22 of the spade 24 and controls its action. The opposite end 25 of the marker arm is made into a flat plate and is provided with a slot 26. A sleeve 34 carrying an adjustment plate 30 is rigidly locked on each end of shaft 12 by means of a clamping nut 35. The plate 30 is also provided with a semi-circular slot 32. The marker is adjustably secured on the shaft 12 and against the plate 30 by the threaded ends of the shaft 12 projecting through the slots 26 and held thereon by the nut 35. The marker is further adjustably secured to the plate 30 by a bolt 37 passing through the slots 26 and 32 and held by a nut 36. The adjustment as to length is made by loosening the screw 35 and then lengthening or shortening the marker by drawing it down or pushing it upward with the threaded end in the slot 26 and when the desired length is obtained the nut 35 is tightened. If the adjustment desired relates to the angle at which the spade 24 is to engage the ground, then the nut 36 is loosened and the adjustment is made in the slot 32.

Against the rear of the tubes 5 near their upper ends, are secured sleeves 39 which furnish bearings for a shaft 44.

For the purpose of dropping the initial hill of a row at a given place or for correcting the dropping at any point in the row and for marking the ground for the initial hill on a parallel row, there is attached to the shaft 12 a slotted dog 40 and in the slot is journaled a wheel 42. To the shaft 44 is also secured a collar 47 to which is adjustably attached a rod 50 that extends down to the bottom of the tube 5 and is there attached to a valve (not shown). On the shaft 44 is also rigidly fixed a bent arm 45 and on the cross bar 9 is secured by a staple or strap 52 an arm 48 provided with a hook 49.

The hook 49 is connected to the arm 45 by a spring 46. To the shaft 12 is rigidly attached a collar 55 provided with teeth 56 and adjacent thereto upon said shaft 12 is loosely attached another collar 58 provided with the sprockets 60 in its periphery and with teeth 62 adapted to engage the teeth 56 of the collar 55. At the other end of the collar is a shoulder 64, leaving a space 63 between the sprockets and shoulder for the purpose presently to appear.

Upon the cross bar 9 is secured a bracket 65 provided with a stay 67 attached to the plate 8 upon one side bar 6. To the bracket is pivoted a lever arm 66 by the pivot pin 68. Upon the lever 66 is loosely hung a hook 72 to which a sprocket chain 70 is linked. The chain extends down beneath the collar 58 engaging the sprockets 60 and is attached at its other end to the outer end 71 of the lever 66.

For the purpose of bringing the cogs 62 on the collar 58 into operative mesh with the cogs 56 on the collar 55 there is attached to the cross bar 9 another bracket 74 to which is secured a rectangular frame 75 having one long side 76 and a shorter side 78 with an end 80. Against the side 78 is pivoted a lever 82 by a pivot pin and provided with a handle 85. To the lever 82 is pivoted a lever 86 which is provided with the arms 88 that engage the collar 58 in the space 63 and between the shoulder 64 and sprockets 60.

The operator in operating this part of our device grasps the handle 85 of the lever 82 and by a lateral movement forces the cogs 62 into mesh with the cogs 56 on the collar 55 then forces down the lever 66 which rotates the sprocket collar 58 and this rotates the shaft 12. When the shaft 12 is rotated partly around, the wheel 42 of the dog 40 engages the end of the arm 45 and turns it backward and since said arm is rigid on the shaft 44, the shaft will be rotated and the rotation of the shaft 44 will draw up the rod 50 and drop the corn that is in the tube 5. At the same time that the shaft 12 rotates, the markers are brought into contact with the ground on a line with the hill just dropped and at the required distance the rows are to be apart.

If it be for a correction while planting along in the middle of the row or any distance from the end, then the team is stopped and the same operation is repeated as is above set out for dropping the initial hill of a row. After the initial hill has been dropped in the second row on a line with the hill in the first row and the ground has been marked for the next succeeding row there is often much time wasted in dropping and marking the second hill and others in the second row in the same line as the corresponding hill in the first row. This is occasioned because the drive sprocket wheel cannot be brought into engagement with the collar on the axle at the exact place where the initial hill was marked, since the cogs of the collar on the axle and the sprocket wheel are so very coarse and frequently the team has to be stopped or backed a trifle in order to make the proper engagement. To overcome this and to always be able to bring the drive sprocket wheel into action at any time desired, there is provided on one side of the sprocket wheel 90 on shaft 10 and integral therewith a short tube or sleeve 91 having very fine teeth 92 around on the inside of the tube and the collar 94 that is secured upon the shaft 10 is provided with very fine teeth 95 on its periphery which are beveled at their edges so that they will always engage with the fine teeth 92 in the tube or sleeve 91. In this manner whenever the initial hill is dropped then the sprocket wheel can be brought directly into engagement with the collar on the shaft 10 at any point and the team can proceed at once and always the marking of the hills will be in the same parallel lines and at right angles to the lines of the row previously dropped.

As any means for bringing the cogs 92 and 95 into operative engagement with each other may be employed and the planting of the corn forms no part of our invention, they are not illustrated or described.

In the practical operation of this mode of construction of the drive sprocket wheel and the very fine teeth on the periphery of the collar that slide into mesh with the teeth on the inside of the sprocket wheel we are enabled to mark the ground for the initial hill on each new row in the same straight line with the initial hill of the preceeding row and with great accuracy as these teeth can be brought into mesh with each other without rotating the drive wheel to any appreciable distance.

It will be observed that when the markers are brought into engagement with the ground, if the spade 24 strikes a stone or hard lump of soil, the spring will be retracted and the stem 22 of the spade will be forced up into the body 18 of the marker and if the spade goes into a "dead-furrow" or other opening in the ground the spring will force the spade into the opening and in all conditions the marking will be both on a line parallel with and on a line at right angles to the row dropped.

It will further be seen that whenever in planting an initial hill, in a field or when having finished a row and the team has been turned to start in planting other rows that the operator can always drop the initial hill of the rows in the same line and if for any reason there should be a hill missed or improperly dropped, it can be readily corrected as herein before described.

Having now described our invention what we claim is:

1. In a device of the class described a frame, a shaft mounted to rotate in the frame and extending beyond the frame, a marker arm rotatably adjustable on the end of the shaft, and a spring actuated spade secured to the marker arm.

2. In a device of the class described a frame, a shaft mounted on the frame and adapted for rotation, a marker adjustably secured to the end of the shaft, and means for adjusting the marker to engage the ground at different points on the rotation of the shaft.

3. In a device of the class described a frame, a shaft mounted on the frame and extending beyond the frame at both sides, a marker arm adjustably secured to the ends of the shaft, a spring actuated spade secured to the marker arm, and means for rotatably adjusting the marker arm.

4. In a device of the class described, a frame provided with boxes adapted to hold the grain to be dropped provided with mechanism for dropping the grain, a shaft mounted for rotation in the frame and connected with the dropping mechanism, a marker arm rotatable on the end of the shaft, means for securing the marker in adjusted position to the shaft and a spring actuated spade secured to the marker arm.

5. In a device of the class described, a frame provided with boxes for holding the grain to be dropped and with selecting mechanism, a shaft mounted in said frame and connected to the selecting mechanism and extending beyond the sides of the frame, a marker arm rotatable on but normally fixed to the end of the shaft, a spring-actuated spade secured to the marker arm, and means for securing the marker arm in its different adjusted positions.

6. In a device of the class described, a frame, a shaft journaled in the frame, markers on the end of the shaft, means for manually rotating said shaft in opposite directions, and means connected with the shaft for adjusting the marker to engage the ground at different points on the rotation of the shaft.

7. In a device of the class described, a frame, a shaft journaled in the frame, a marker arm adjustably secured to the ends of the shaft and rotatable on the shaft, a spring actuated spade adjustably secured to the marker arm, and adapted to engage the ground at different points, a sprocket wheel loose on the shaft and carrying sprocket chain, means for connecting the sprocket wheel to and disconnecting it from the shaft, and a lever to which said sprocket chain is attached for operating the shaft to cause the spade to attack the ground at a given point.

8. In a device of the character described, a frame, a shaft mounted on the frame, a marker rotatable on the end of the shaft, means for securing the marker in different positions and against movement on the shaft, a second shaft journaled in the frame, means for operating the second shaft from the first shaft, and means operated by the second shaft for dropping corn.

9. In a device of the class described, a frame, a shaft journaled in the frame, a marker arm adjustably secured to the ends of the shaft means for adjusting the arm both in length and different angles to the ground, a sprocket wheel loose on the shaft, a second shaft having operative connections with the first shaft and a lever secured to the frame carrying the sprocket chain adapted to engage the sprocket wheel on the first shaft and manually operate both shafts to drop the corn and mark the ground at the same time and in the same straight line.

10. In a device of the class described a frame, a shaft journaled in the frame, a marker arm adjustably secured to the ends of the shaft, a spring actuated spade secured to the marker arm, means for rotatably adjusting the marker arm on the shaft, a second shaft having connections with the dropping mechanism, connections between the two shafts, and means for manually rotating the first shaft to operate the second shaft to drop the grain and the first shaft to mark the ground in lines both parallel with and at right angles to the line in which the grain is dropped.

11. In a device of the class described, a frame, a shaft journaled in the frame, a slotted plate secured on the outer end of the shaft, and a marker arm provided with a slot attached to the ends of the shaft and adapted to be adjusted in length in said slot and adjusted at an angle to the ground in the slot in the plate.

12. In a device of the class described, a frame, a shaft journaled in the frame, a plate provided with a slot secured near the outer ends of the shaft, a marker arm provided with a slot secured to the outer ends of the shaft and against said plate and adapted to be adjusted in length in said slot and adjusted in the slot in said plate at an angle to the ground, and a spring actuated spade secured in the end of the marker arms.

13. In a device of the class described, a frame, a shaft journaled in the frame, a marker arm secured to the ends of the shaft for adjusting the arm in length and at an angle to the ground, a spring actuated spade secured to the marker arm, and means secured in the frame and engaging the shaft to manually rotate the shaft to mark the ground at a given point.

14. In a device of the class described, a frame, a shaft journaled in the frame, a marker secured to the ends of the shaft, means for adjusting the markers in length and at an angle to the ground, a sprocket wheel on the shaft, a second shaft mounted in the frame, means connected with the first shaft for operating the second shaft, and means engaging the sprocket wheel on the first shaft for manually rotating the first shaft to mark the ground and the second shaft to drop the grain.

15. In a device of the class described, a frame, a shaft journaled in the frame and operatively connected with the dropping mechanism of a corn planter and provided with a sprocket wheel, a marker adjustably secured to the ends of the shaft, a drive sprocket wheel provided with fine mesh on its inner face and operatively connected with the sprocket wheel on said shaft, and a collar on the axle provided with fine mesh on its periphery and adapted to be brought into engagement with the teeth in the drive sprocket wheel immediately upon the marking the ground for the initial hill of a row.

16. In a device of the class described, a frame, a shaft journaled in the frame, a marker attached to each end of the shaft, means for adjusting the length of the marker and at an angle to the ground, a sprocket wheel on the shaft, an axle, a collar on the axle provided with fine teeth on its periphery, a drive sprocket wheel on the axle provided with fine teeth on its inner side adapted to be brought into mesh with the teeth on the collar, a sprocket chain connecting the sprocket wheel on the axle and the shaft, and means connected with the shaft for manually rotating the shaft to mark the ground at a given point at the same time the sprocket wheel on the axle has been brought into mesh with the collar to start the planter.

In testimony whereof we affix our signatures in presence of two witnesses.

FRANK J. KRIVACHEK.
MATTHEW A. KRIVACHEK.

Witnesses:
GEO. A. BIEBER,
JAS. CHEKAL.